United States Patent [19]
Vass

[11] Patent Number: 5,779,256
[45] Date of Patent: Jul. 14, 1998

[54] HITCH GUIDE FOR GUIDING A HITCH COUPLING OF A TRAILER INTO ALIGNMENT WITH A HITCH BALL

[76] Inventor: Theodore W. Vass, Box 91, Lestock Saskatchewan, Canada, S0A 2G0

[21] Appl. No.: 621,600

[22] Filed: Mar. 26, 1996

[51] Int. Cl.⁶ .................................................. B60D 1/36
[52] U.S. Cl. .............................. 280/477; 280/511
[58] Field of Search .............................. 280/477, 507, 280/511, 504, 508

[56] References Cited

U.S. PATENT DOCUMENTS

| | | | |
|---|---|---|---|
| 3,765,703 | 10/1973 | Voelkerding et al. | 280/477 |
| 3,879,062 | 4/1975 | Miller | 280/477 |
| 4,417,748 | 11/1983 | Dortch | 280/477 |
| 4,708,359 | 11/1987 | Davenport | 280/477 |
| 4,840,392 | 6/1989 | Baskett | 280/507 |
| 5,330,196 | 7/1994 | Ricles | 280/511 |
| 5,529,330 | 6/1996 | Roman | 280/511 |

*Primary Examiner*—Daniel G. DePumpo
*Attorney, Agent, or Firm*—Adrian D. Battison; Murray E. Thrift

[57] ABSTRACT

A hitch guide comprises a generally V-shaped member mounted in a horizontal orientation with the base of the V forwardly of the ball and two arms extending rearwardly. The V-shaped guide member is releasably mounted on a horizontal plate underneath the ball by two vertical pins adjustably mounted on the arms which drop into holes in the plate. Thus the guide member is used only when backing up the towing vehicle to the hitch and guides the hitch coupling in the V-shape to a position directly over the ball. When aligned, the guide member is removed for regular towing.

1 Claim, 1 Drawing Sheet

HITCH GUIDE FOR GUIDING A HITCH COUPLING OF A TRAILER INTO ALIGNMENT WITH A HITCH BALL

This invention relates to a hitch guide for mounting on a trailer hitch of a towing vehicle and for guiding a hitch coupling of a trailer into alignment with a hitch ball mounted on the trailer hitch of the towing vehicle.

BACKGROUND OF THE INVENTION

It is well known by any person used to connecting a towing vehicle to a trailer that it is difficult to back up the towing vehicle directly into alignment with the trailer so that the hitch coupling of the trailer directly overlies the connecting ball of the hitch of the towing vehicle. When the trailer is relatively light, this is not a significant problem since the trailer can be shifted manually to the required aligned position. However when the trailer is heavy, it is necessary to provide direct alignment so that the trailer can be lowered directly onto the ball. If the towing vehicle is misaligned, it is necessary to remove the towing vehicle and to back up again until the alignment is correct. This often requires the driver to alight from the vehicle a number of times to check alignment and to move forwards and backwards a number of times to complete the alignment.

SUMMARY OF THE INVENTION

It is one object of the present invention, therefore, to provide a hitch guide which allows the trailer hitch coupling to be directly aligned with the ball.

According to one aspect of the invention there is provided a hitch guide for mounting on a trailer hitch of a towing vehicle and for guiding a hitch coupling of a trailer into alignment with a hitch ball mounted on the trailer hitch of the towing vehicle, the hitch guide comprising: a generally V-shaped guide member having a base and two arms; and mounting means for mounting the guide member on the trailer hitch so that the base and two arms lie generally in a horizontal orientation with the base in front of the ball and the two arms extending rearwardly and outwardly to respective sides of the ball so as to engage the hitch coupling and guide the hitch coupling toward the base as the towing vehicle is moved toward the hitch coupling, the mounting means providing readily releasable and reengageable mounting of the guide member on the trailer hitch.

Preferably each of the base and arms comprises a vertical plate for the arms welded to the base.

Preferably the trailer hitch includes a plate mounting the hitch ball, the plate extending outwardly to each side of the hitch ball and including a vertical hole therethrough and wherein the mounting means comprises a pair of vertical pins each for engaging through a respective one of the holes and connecting means for connecting the vertical pin to the guide member.

Preferably the connecting means includes means for adjusting the position of the vertical pin relative to the guide member.

Preferably the connecting means includes means for adjusting the height of the guide member relative to the vertical pin.

Preferably the connecting means includes means for adjusting the position of the base member relative to the vertical pins so as to adjust the position of the base member relative to the ball.

Preferably the connecting means includes a sleeve welded on an outside face of the arm and a pin slidable vertically in the sleeve, the pin being connected to the vertical pin by a horizontal connecting bar.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
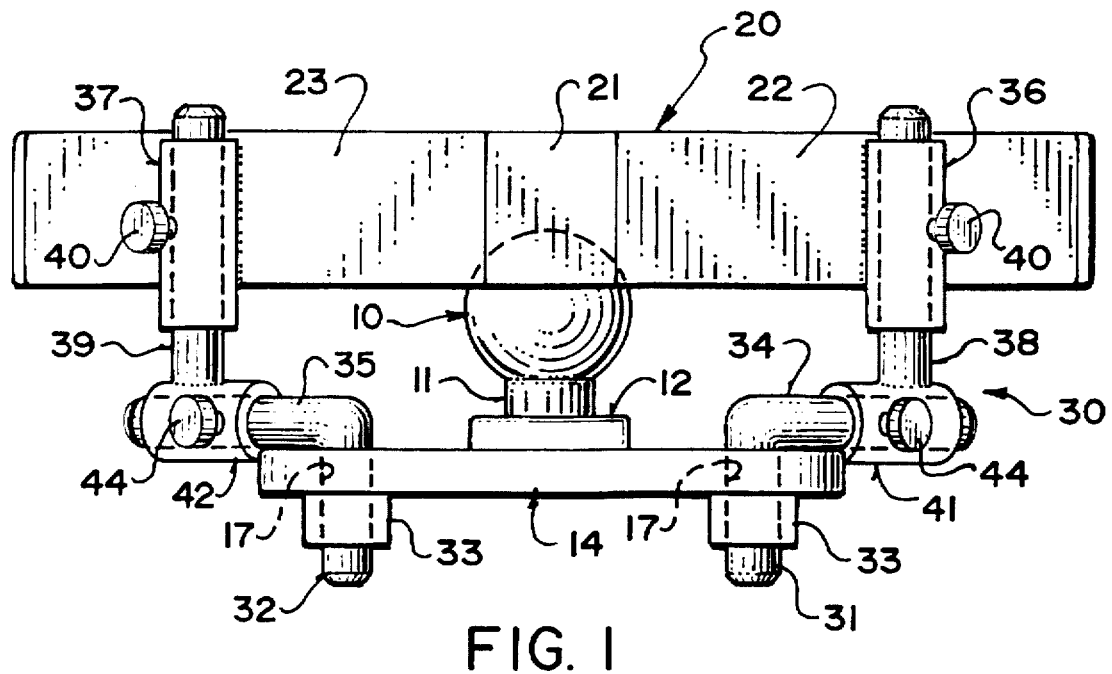
FIG. 1 is a rear elevational view of the hitch guide according to the present invention.
Figure 2:
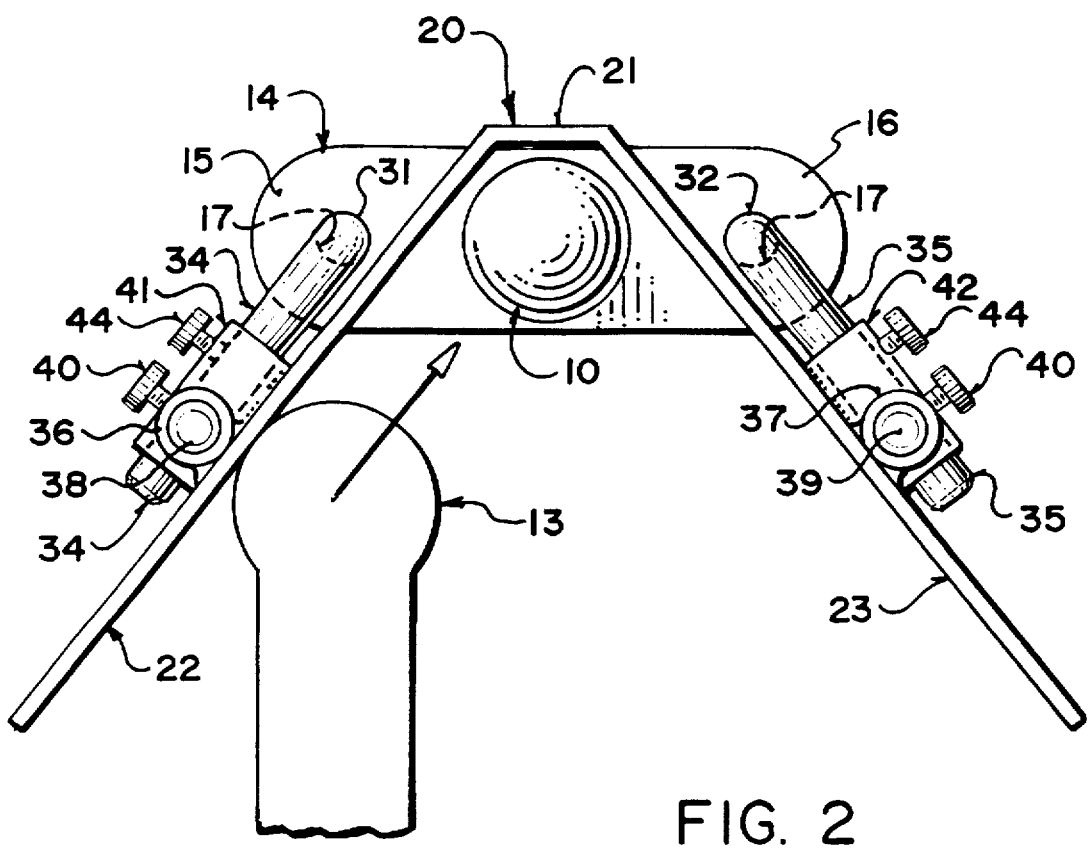
FIG. 2 is a top plan view of the hitch guide of FIG. 1.

A conventional hitch ball of a hitch of a towing vehicle is indicated generally at 10 including a neck 11 and mounted on a boss 12. This cooperates in conventional manner with a hitch coupling 13 of a trailer. The towing vehicle and the trailer are not illustrated as these of course are conventional.

The hitch ball 12 is mounted on a mounting plate 14 which is horizontal underneath the boss 12 and extends outwardly to each side of the ball to define a pair of wings 15 and 16. Each wing includes a vertical hole 17 so that the holes are aligned on each side of the ball 10 and arranged symmetrically relative thereto.

The hitch guide member comprises a generally V-shaped guide member 20 having a flat metal base 21 and a pair of metal arms 22 and 23 welded to the base. The arms and the base are of the same height which generally is of the order of two to four inches which is sufficient to engage and guide the hitch guide coupling 13. The V-shaped guide member lies generally in a horizontal orientation so that the base 21 is vertical and lies in front of the hitch ball 10 symmetrically relative thereto about a centre line of the towing vehicle. Each arm then extends from the base rearwardly from the vehicle and outwardly to one side so as to define a V-shaped receptacle presented rearwardly of the ball 10 into which the hitch coupling 13 can be directed.

The height of the V shaped guide member as shown in FIG. 1 is arranged so that it is adjacent the top of the ball 10. In this way with the hitch coupling 13 at a height slightly above the ball, the arms engage the hitch coupling for directing it toward the ball as the vehicle is moved rearwardly. The hitch coupling is directed toward the ball simply by the sliding action caused by a rearward force on the hitch coupling as the vehicle moves rearwardly thus sliding the hitch coupling along the arm impacted by the hitch coupling until the hitch coupling reaches the base of the V-shaped guide member at which time it lies directly over the ball. The positioning of the base is just forwardly of the ball and the width of the base is arranged relative to the transverse dimensions of the hitch coupling so that when the hitch coupling is directly received within the base of the V shaped guide member it is positioned directly over the ball.

The V-shaped guide member is mounted so that its position is adjustable vertically and horizontally so that its height can be adjusted relative to the ball and the position of the base relative to the ball can be adjusted forwardly and rearwardly.

For this purpose the V-shaped guide is mounted on a mounting assembly generally indicated at 30. The mounting assembly includes a pair of mounting pins 31 and 32 which project through respective ones of the holes 17 in the plate 14. A collar 33 is mounted on the plate on the underside thereof so as to reinforce the holes and to provide a longer engagement with the pins 31 and 32 to allow communication of significant forces therebetween. The pins 31 and 32 are respectively welded to horizontal rods 34 and 35 which extend forwardly from the vertical pin generally along the rear of the respective arm 22, 23.

On the outside surface of each arm is welded a vertical sleeve 36, 37 which is positioned approximately midway along the length of the arm. Within the sleeve is mounted a vertical rod 38, 39 which is slidable within the sleeve and its position can be locked by a thumb screw 40. At the bottom of the vertical rods 38 and 39 is welded a horizontal sleeve 41, 42 which receives in sliding fit a respective one of the horizontal rods 34, 35. The position of the horizontal rod in the respective sleeve is adjustable and can be locked by a thumbscrew 44.

In operation, the guide member is first located on the mounting plate 14 simply by slipping the vertical pins 31, 32 through the respective holes in the guide plate. In this initial position, the thumb screws 40 and 44 are loosened and the position of the V-shaped guide member adjusted so that its height is at the top of the ball and the base 21 is just in front of the ball by a distance sufficient to receive the hitch coupling within the base and located over the ball.

When this adjustment is complete the thumb screws 40 and 44 are locked. With the hitch guide thus adjusted, the hitch guide can be readily removed from the mounting plate when the device is not required. Thus the device is simply stored in place on the vehicle and can be dropped into position on the mounting plate just before backing up into engagement with the hitch coupling 13 of the trailer. When the hitch process is complete after alignment with the hitch coupling with the ball, the hitch guide is immediately removed so that the trailer can be properly towed. It will be appreciated that the arms 22 and 23 project rearwardly from the ball a significant distance probably of the order of six to nine inches and would normally prevent proper towing and steering of the trailer relative to the vehicle. It is essential therefore that the element be readily removable and replaceable without the necessity for clamping, bolts or the like.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A hitch assembly for mounting on a towing vehicle for engagement with a hitch coupling of a trailer, the assembly comprising:

a hitch ball;

a horizontal mounting plate for the hitch ball having a pair of side plate wings extending outwardly to respective sides of the ball, each side plate wing having a vertical hole therethrough which is circular in plan at a position on the wing such that the ball and the holes are substantially aligned across the mounting plate;

and a hitch guide for guiding the hitch coupling into alignment with the hitch ball, the hitch guide comprising:

a generally V-shaped guide member having a vertical base plate and two vertical side plates;

and mounting means for mounting the guide member on the trailer hitch so that the base plate and two side plates lie generally in a horizontal orientation with the base plate in front of the ball and the two side plates extending rearwardly and outwardly to respective sides of the ball so as to engage the hitch coupling and guide the hitch coupling toward the base plate as the towing vehicle is moved toward the hitch coupling;

the mounting means comprising:

a pair of cylindrical vertical pins each arranged to be readily releasable and reengageable in a respective one of the circular holes;

a pair of horizontal support arms each attached to and extending rearwardly and outwardly from an upper end of a respective one of the pins;

a pair of horizontal first sleeves, each mounted on a respective one of the arms for sliding movement therealong;

a pair of vertical posts which are circular in cross-section each carried on a respective one of the first sleeves;

and a pair of vertical second sleeves each attached to a respective one of the side plates and each defining a cylindrical bore receiving a respective one of the posts for sliding movement therealong.

* * * * *